(12) United States Patent
Moriwaka et al.

(10) Patent No.: US 9,590,249 B2
(45) Date of Patent: Mar. 7, 2017

(54) ELECTRICITY STORAGE DEVICE

(75) Inventors: Tamae Moriwaka, Kanagawa (JP); Tatsuya Takahashi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 1200 days.

(21) Appl. No.: 12/987,331

(22) Filed: Jan. 10, 2011

(65) Prior Publication Data

US 2011/0177396 A1 Jul. 21, 2011

(30) Foreign Application Priority Data

Jan. 15, 2010 (JP) ................................. 2010-007001

(51) Int. Cl.
*H01M 4/02* (2006.01)
*H01M 4/587* (2010.01)
(Continued)

(52) U.S. Cl.
CPC .......... *H01M 4/587* (2013.01); *H01M 4/133* (2013.01); *H01M 4/134* (2013.01); *H01M 4/136* (2013.01); *H01M 4/362* (2013.01); *H01M 4/366* (2013.01); *H01M 4/38* (2013.01); *H01M 4/405* (2013.01); *H01M 4/58* (2013.01); *H01M 10/054* (2013.01); *H01M 10/0525* (2013.01); *H01M 10/0565* (2013.01); *H01M 4/02* (2013.01); *H01M 4/131* (2013.01); *H01M 2300/0085* (2013.01); *Y02E 60/122* (2013.01)

(58) Field of Classification Search
CPC ........ H01M 4/02; H01M 4/134; H01M 4/136; H01M 4/362; H01M 4/405

USPC ............................................ 429/231.95, 304
See application file for complete search history.

(56) References Cited

U.S. PATENT DOCUMENTS 5,387,479 A    2/1995   Koksbang
5,834,139 A    11/1998  Shodai et al.
(Continued)

FOREIGN PATENT DOCUMENTS

EP          0752728 A    1/1997
JP          63-298980 A  12/1988
(Continued)

*Primary Examiner* — Basia Ridley
*Assistant Examiner* — James Erwin
(74) *Attorney, Agent, or Firm* — Nixon Peabody LLP; Jeffrey L. Costellia

(57) ABSTRACT

An object is to improve characteristics of a power storage device. The present invention relates to an electricity storage device comprising a current collector and a negative electrode-active material layer formed over the current collector. The negative electrode-active material layer includes a negative electrode comprising a first negative electrode layer in contact with the current collector; a second negative electrode layer in contact with the first negative electrode layer, having a smaller capacitance than the first negative electrode layer and containing one material selected from a nitride of lithium and a transition metal represented by $Li_aM_bN_z$ (M is a transition metal, $0.1 \leq a \leq 2.8$, $0.2 \leq b \leq 1$ and $0.6 \leq z \leq 1.4$), a silicon material, and lithium titanate; a positive electrode that is paired with the negative electrode; and a solid electrolyte interposed between the positive electrode and the negative electrode.

20 Claims, 5 Drawing Sheets

(51) Int. Cl.
*H01M 4/40* (2006.01)
*H01M 4/36* (2006.01)
*H01M 4/133* (2010.01)
*H01M 4/134* (2010.01)
*H01M 4/136* (2010.01)
*H01M 4/38* (2006.01)
*H01M 4/58* (2010.01)
*H01M 10/0525* (2010.01)
*H01M 10/054* (2010.01)
*H01M 10/0565* (2010.01)
*H01M 4/131* (2010.01)

(56) References Cited

U.S. PATENT DOCUMENTS

| | | | |
|---|---|---|---|
| 6,821,675 B1 | 11/2004 | Morigaki et al. | |
| 6,989,218 B2 | 1/2006 | Yamada et al. | |
| 7,141,334 B2 | 11/2006 | Fukui et al. | |
| 7,202,000 B2 | 4/2007 | Iriyama et al. | |
| 7,527,894 B2 * | 5/2009 | Lin | H01M 10/049 29/623.1 |
| 7,582,387 B2 | 9/2009 | Howard et al. | |
| 8,435,671 B2 | 5/2013 | Zaghib et al. | |
| 2002/0182507 A1* | 12/2002 | Tsutsumi et al. | 429/231.95 |
| 2003/0036000 A1* | 2/2003 | Mori | H01M 4/13 429/231.95 |
| 2004/0175621 A1* | 9/2004 | Iriyama et al. | 429/231.95 |
| 2004/0258997 A1 | 12/2004 | Utsugi et al. | |
| 2005/0132562 A1 | 6/2005 | Saito et al. | |
| 2006/0040182 A1 | 2/2006 | Kawakami et al. | |
| 2008/0032192 A1* | 2/2008 | Yokomizo | H01M 4/13 429/210 |
| 2009/0117466 A1* | 5/2009 | Zhamu et al. | 429/231.8 |
| 2013/0216914 A1 | 8/2013 | Zaghib et al. | |

FOREIGN PATENT DOCUMENTS

| | | |
|---|---|---|
| JP | 06-338345 A | 12/1994 |
| JP | 08-124597 A | 5/1996 |
| JP | 09-035714 | 2/1997 |
| JP | 2001-202999 A | 7/2001 |
| JP | 2003-115293 A | 4/2003 |
| JP | 2003-249211 A | 9/2003 |
| JP | 2003-346788 A | 12/2003 |
| JP | 2004-192829 A | 7/2004 |
| JP | 2005-353309 A | 12/2005 |
| JP | 2006-073480 A | 3/2006 |
| JP | 2008-305746 A | 12/2008 |
| JP | 2009-525568 | 7/2009 |
| JP | 2009-190954 A | 8/2009 |

* cited by examiner

ELECTRICITY STORAGE DEVICE

BACKGROUND OF THE INVENTION

1. Field of the Invention

One mode of the present invention relates to an electricity storage device and a structure of a negative electrode of the electricity storage device.

2. Description of the Related Art

In recent years, with the advance of environmental technology, power generation devices (for example, solar power generation devices), which pose fewer burdens on the environment than conventional power generation methods, have been actively developed. Along with development of power generation devices, power storage devices have also been developed.

As a power storage device, a secondary battery such as a lithium ion secondary battery (alternatively called a lithium ion storage battery or simply a lithium ion battery) can be given as example (see Patent Document 1). Lithium ion secondary batteries have high energy density and are widely popular because they are suited for miniaturization.

Similarly, as a type of power storage device, capacitors are being developed. As one of such capacitors, lithium ion capacitors can be given as examples.

As an electrolyte of the lithium ion secondary batteries mentioned above, a liquid electrolyte (called "electrolytic solution") or a solid electrolyte is used. A nonaqueous electrolytic solution is normally used as the electrolytic solution, with which a high voltage which exceeds electrolysis voltage of water can be obtained. Also, as a solid electrolyte, a gel electrolyte or a polymer electrolyte can be given as examples. When a solid electrolyte is used, there is an advantage in that leakage does not occur easily compared to an electrolytic solution.

REFERENCE

[Patent Document 1] Japanese Published Patent Application No. 9-35714

SUMMARY OF THE INVENTION

As mentioned above, compared to a structure using an electrolytic solution, there is less chance of leakage occurring with the lithium ion secondary battery using a gel electrolyte or a polymer electrolyte. Because leakage does not easily occur with a lithium ion secondary battery using a solid electrolyte, there is high level of safety.

In contrast, with a lithium ion secondary battery using an electrolytic solution, in the case that the electrolytic solution has leaked, there is a concern that the internal pressure of the lithium ion secondary battery may become high due to the electrolytic solution or to a gas generated from the leaked electrolytic solution.

However, a solid electrolyte has a low fluidity compared to a liquid electrolyte (electrolytic solution), and it is difficult to obtain favorable contact interfaces for electrodes manufactured using an active material in a powder form. Also, it is known that adhesion is poor between graphite (for example, a layer-form graphite) which is a typical negative electrode in a lithium ion secondary battery, and a solid electrolyte such as PEO (polyethylene oxide), and improvement is needed.

When adhesion between the negative electrode and the solid electrolyte is poor, a region in which an insertion-elimination reaction of lithium ion is not performed is formed at an interface between the negative electrode and the solid electrolyte. Consequently, resistance at the interface between the negative electrode and the solid electrolyte becomes large which increases the internal resistance of the power storage device, and this causes degradation of a charge/discharge characteristic or the like of electricity storage devices using this structure.

In view of the above problem, an object of one mode of the present invention is to improve adhesion between a solid electrolyte and a negative electrode in a power storage device typified by a lithium ion secondary battery.

An object of one mode of the present invention is to control increase of resistance at an interface between the negative electrode and the solid electrolyte.

An object of one mode of the present invention is to improve a characteristic (for example, a charge/discharge characteristic) of a power storage device.

One mode of the present invention is a power storage device including a solid electrolyte, wherein a negative electrode of the power storage device includes negative electrode current collector and a negative electrode-active material layer provided over the negative electrode current collector, and the negative electrode-active material layer is formed of a plurality of layers with different compositions. For example, the negative electrode includes at least two negative electrode-active material layers, which are a first negative electrode-active material layer that is in contact with the negative electrode current collector, and a second negative electrode-active material layer that is in contact with a solid electrolyte.

As materials for the second negative electrode-active material layer with favorable adhesion to the solid electrolyte, the following can be given: a nitride of lithium and a transition metal represented by $Li_aM_bN_z$ where $0.1 \leq a \leq 2.8$ (a is 0.1 or more and 2.8 or less), $0.2 \leq b \leq 1.0$ (b is 0.2 or more and 1.0 or less), and $0.6 \leq z \leq 1.4$ (z is 0.6 or more and 1.4 or less), which contains lithium (Li), a transition metal (represented by M), and nitrogen (N); a silicon material; and lithium titanate ($Li_4Ti_5O_{12}$).

During charging and discharging of the power storage device, an insertion-elimination reaction of ions (for example, lithium ions) functioning as carriers occurs.

With respect to this, each of the materials mentioned above has a small volume change in the insertion-elimination reaction of the ions functioning as carriers, compared to graphite. Providing in contact with a solid electrolyte a thin film made of such a material with a small volume change is effective to reduce warping due to stress at an interface with the solid electrolyte.

Also, in the same manner as the above-mentioned nitride of lithium and a transition metal represented by $Li_aM_bN_z$, the silicon material and lithium titanate ($Li_4Ti_5O_{12}$) each have a small volume change during the insertion-elimination reaction of the ions functioning as carriers, compared to graphite. By providing a thin film made of such a material with small volume change in contact with a solid electrolyte, the thin film reduces warping due to stress at a contact surface with the solid electrolyte.

Note that, in the above-mentioned nitride of lithium and a transition metal represented by $Li_aM_bN_z$, M represents one type or a plurality of types of metal. In the case that M includes one type of metal, any one of cobalt, nickel, and copper may be selected. In the case that M includes a plurality of types of metals, at least one of cobalt, nickel and copper are included, and a Group 3 element, a Group 4 element, or a Group 5 element may additionally be included.

Since it is preferable that M be a metal with which an oxidation-reduction reaction occurs and a metal whose valence changes, a transition metal is used. Among transition metals any one of cobalt, nickel, and copper may be selected in the case that M is one type of transition metal, for the reason explained below.

A large electrical capacitance can be obtained by using nitrides of lithium and a transition metal, particularly when using $Li_{3-x}Co_xN$, $Li_{3-x}Ni_xN$, and $Li_{3-x}Cu_xN$ each having a lithium nitride ($Li_3N$) type structure, because the insertion-elimination reaction of lithium ions progresses with a low voltage of 1 V (vs $Li^+/Li$) or lower.

Although charging and discharging is possible with a low potential and a large capacitance can be obtained with the above-mentioned nitrides of lithium and a transition metal, volume change is large because a charging/discharging capacitance is large. Accordingly, a negative electrode layer made of such materials is preferably formed thinly over a surface and to have a structure with which effect of volume change can be made as small as possible.

Alternatively, instead of lithium (Li) in $Li_aM_bN_z$, an alkaline metal element such as sodium (Na) or potassium (K), or an alkaline earth metal element such as beryllium (Be), magnesium (Mg), calcium (Ca), strontium (Sr), or barium (Ba) may be used.

This is because with the above-mentioned alkaline metal element other than lithium, or the alkaline earth metal element, an insertion-elimination reaction of ions functioning as carriers also occurs during charging and discharging, in the same manner as with lithium.

In the case of using the other alkaline metal element or the alkaline earth metal element mentioned above instead of lithium in $Li_aM_bN_z$, volume change in the insertion-elimination reaction of ions functioning as carriers is also small, and the same effect as in the case of using lithium is obtained.

One mode of the present invention is a power storage device including a current collector and a negative electrode-active material layer formed over the current collector, in which the negative electrode-active material layer includes a first negative electrode layer in contact with the current collector and a second negative electrode layer being in contact with the first negative electrode layer, having a smaller capacitance per unit volume than the first negative electrode layer, and containing a nitride of lithium and a transition metal represented by $Li_aM_bN_z$ (M is a transition metal, and a is 0.1 or more and 2.8 or less, b is 0.2 or more and 1.0 or less, and z is 0.6 or more and 1.4 or less).

Another mode of the present invention is a power storage device including a current collector and a negative electrode-active material layer formed over the current collector, in which the negative electrode-active material layer includes a first negative electrode layer in contact with the current collector and a second negative electrode layer being in contact with the first negative electrode layer, having a smaller capacitance per unit volume than the first negative electrode layer, and containing a material comprising silicon.

Another mode of the present invention is a power storage device including a current collector and a negative electrode-active material layer formed over the current collector, in which the negative electrode-active material layer includes a first negative electrode layer in contact with the current collector and a second negative electrode layer being in contact with the first negative electrode layer, having a smaller capacitance per unit volume than the first negative electrode layer, and containing lithium titanate.

Another mode of the present invention is a power storage device including a current collector and a negative electrode-active material layer formed over the current collector, in which the negative electrode-active material layer includes a negative electrode including a first negative electrode layer in contact with the current collector and a second negative electrode layer being in contact with the first negative electrode layer, having a smaller capacitance per unit volume than the first negative electrode layer, and containing a nitride of lithium and a transition metal represented by $Li_aM_bN_z$ (M is a transition metal, and a is 0.1 or more and 2.8 or less, b is 0.2 or more and 1.0 or less, and z is 0.6 or more and 1.4 or less); a positive electrode paired with the negative electrode; and a solid electrolyte interposed between the positive electrode and the negative electrode.

Yet another mode of the present invention is a power storage device including a current collector and a negative electrode-active material layer formed over the current collector, in which the negative electrode-active material layer includes a negative electrode including a first negative electrode layer in contact with the current collector and a second negative electrode layer being in contact with the first negative electrode layer, having a smaller capacitance per unit volume than the first negative electrode layer, and containing a silicon material; a positive electrode paired with the negative electrode; and a solid electrolyte interposed between the positive electrode and the negative electrode.

Still another mode of the present invention is a power storage device including a current collector and a negative electrode-active material layer formed over the current collector, in which the negative electrode-active material layer includes a negative electrode including a first negative electrode layer in contact with the current collector and a second negative electrode layer being in contact with the first negative electrode layer, having a smaller capacitance per unit volume than the first negative electrode layer and containing lithium titanate; a positive electrode paired with the negative electrode; and a solid electrolyte interposed between the positive electrode and the negative electrode.

Furthermore, the solid electrolyte is a gel electrolyte or a polymer electrolyte.

In a structure of a negative electrode of a power storage device including a solid electrolyte, by providing a layer made of a nitride of lithium and a transition metal in contact with the solid electrolyte, adhesion at a contact surface thereof can be improved. By improving adhesion between the negative electrode and the solid electrolyte, contact resistance at an interface thereof can be made small. Furthermore, by making the contact resistance between the negative electrode and the solid electrolyte small, a charge/discharge characteristic of the power storage device can be improved.

DETAILED DESCRIPTION OF THE INVENTION

Figure 1A:
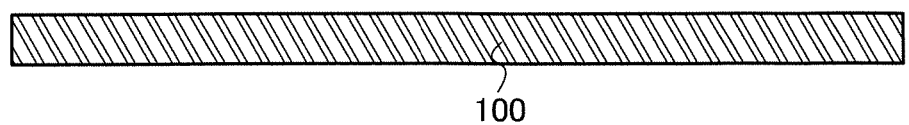
FIGS. 1A to 1C shows a negative electrode-active material layer and a negative electrode including the negative electrode-active material layer, and a method of forming the negative electrode.

Embodiments of the invention disclosed in this specification will be hereinafter described with reference to the accompanying drawings. Note that, the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiments and examples. Note that, in the drawings hereinafter shown, the same portions or portions having similar functions are denoted by the same reference numerals, and repeated description thereof will be omitted.

[Embodiment 1]

In this embodiment, a negative electrode-active material layer of a power storage device, a negative electrode that includes the negative electrode-active material layer that is provided over a current collector, and a manufacturing method thereof will be described with reference to FIGS. 1A to 1C.

In this embodiment, a negative electrode-active material layer 104 will be described, which includes a first negative electrode layer 101 with a large capacitance per unit volume, and a second negative electrode layer 102 that is laminated over the first negative electrode layer 101 and is formed of a material with favorable adhesion to a solid electrolyte. Furthermore, in this embodiment, a negative electrode will be described in which the negative electrode-active material layer 104 is laminated over a current collector 100.

As a material for the first negative electrode layer 101, a material that can store and release ions functioning as carriers such as lithium ions and sodium ions can be given, such as the following: a carbon material such as graphite, or a composite material containing carbon. As such a carbon material or a composite material containing carbon, a carbon material such as graphite in a powder form, a fibrous form, or a layer form, or a composite material containing such a carbon material may be used. The first negative electrode layer 101 formed of the above material has an advantage of having a large capacitance per unit volume.

The second negative electrode layer 102 is made using a material that has favorable adhesion to the first negative electrode layer 101 as well as a favorable adhesion to a solid electrolyte. For the second negative electrode layer 102, the following can be used: a nitride of lithium and a transition metal represented by $Li_aM_bN_z$ ($0.1 \leq a \leq 2.8$ (a is 0.1 or more and 2.8 or less), $0.2 \leq b \leq 1.0$ (b is 0.2 or more and 1.0 or less), $0.6 \leq z \leq 1.4$ (z is 0.6 or more and 1.4 or less)) which contains lithium (Li), a transition metal (represented by M), and nitrogen (N); a silicon material; or lithium titanate ($Li_4Ti_5O_{12}$). If necessary, the second negative electrode layer 102 may be formed by laminating layers made of such materials.

Since adhesion is favorable between the above-mentioned material of the second negative electrode layer 102 and a solid electrolyte, resistance is small at an interface between the solid electrolyte and a negative electrode provided with the above material on its outermost surface. With this structure, a characteristic of the power storage device such as the charge/discharge characteristic is improved.

The second negative electrode layer 102, which is formed of the above-mentioned material with favorable adhesion to the solid electrolyte, is formed over a surface of the first negative electrode layer 101, which is formed of the material with a large capacitance per unit volume. When the negative electrode, in which the second negative electrode layer 102 with favorable adhesion to the solid electrolyte is provided over the first negative electrode layer 101 with a large capacitance per unit volume, is used, a power storage device with a favorable characteristic such as a charge/discharge characteristic, which also has a large capacitance, can be obtained.

Among nitrides of lithium and a transition metal, $Li_{3-x}M_xN$ having a lithium nitride ($Li_3N$) type structure shows the largest charge/discharge capacitance with x at around 0.4. Consequently, the most preferable value of b is 0.4. If the value of b is out of the above-mentioned range, the structure becomes unstable and there is a possibility that proceeding to the charge/discharge of the electricity storage device becomes impossible.

Regarding the value of a, it is preferable that $a=3-b$ in order for $Li_aM_bN_z$ to have a lithium nitride ($Li_3N$) type structure. Regarding the lower limit of a, when the case in which Li is eliminated is considered, a value smaller than 2 can be chosen, which is the value of a when b is at its maximum value of 1. However, in the same manner as b, if the value of a is out of the above-mentioned range, the structure becomes unstable and there is a possibility of the charge/discharge capacitance ceasing to be released.

Furthermore, the value of z is most preferably 1, in order for $Li_aM_bN_z$ to have a lithium nitride ($Li_3N$) type structure. If the value of z is out of the above-mentioned range, there is a possibility of $Li_aM_bN_z$ ceasing to have a lithium nitride ($Li_3N$) type structure.

Note that, M is one or more types of metal. In the case that M includes one type of metal, any one of cobalt, nickel, and copper may be selected. In the case that M includes a plurality of types of metal, at least one or a plurality of cobalt, nickel and copper are included, and a Group 3 element, a Group 4 element, or a Group 5 element may additionally be included.

Since it is preferable that M be a metal with which an oxidation-reduction reaction occurs as well as a metal whose valence changes, a transition metal is used. Among transition metals, any one of cobalt, nickel, and copper may be selected in the case that M is one type of transition metal, and a reason for this is explained below.

Among nitrides of lithium and a transition metal, a large capacitance can be obtained particularly with $Li_{3-x}Co_xN$, $Li_{3-x}Ni_xN$, and $Li_{3-x}Cu_xN$ each having a lithium nitride ($Li_3N$) type structure, because the insertion-elimination reaction of lithium ions progresses with a low voltage of 1 V (vs $Li^+/Li$) or lower.

Alternatively, instead of lithium (Li) in $Li_aM_bN_z$, an alkaline metal such as sodium (Na) or potassium (K), or an alkaline earth metal such as beryllium (Be), magnesium (Mg), calcium (Ca), strontium (Sr), or barium (Ba) may be used.

Since the above-mentioned alkaline metal element other than lithium or the alkaline earth metal element is low in cost compared to lithium, by using the above-mentioned element instead of lithium, manufacturing cost of the power storage device can be reduced.

In the case of using the other alkaline metal element or the alkaline earth metal element mentioned above instead of lithium in $Li_aM_bN_z$, since adhesion is favorable between such a material and a solid electrolyte, resistance is small at an interface between the solid electrolyte and a negative electrode provided with the above material on its outermost surface. With this, a characteristic of the power storage device such as the charge/discharge characteristic is improved.

When a negative electrode, in which a thin film with favorable adhesion to the solid electrolyte is provided over a negative electrode layer with a large capacitance per unit volume, is used, a power storage device with a favorable characteristic such as a charge/discharge characteristic, which also has a large capacitance, can be obtained.

Also, in the case where a silicon material is used for the second negative electrode layer 102, a material obtained by forming microcrystalline silicon and then removing amorphous silicon that is in the microcrystalline silicon by etching may be used. When amorphous silicon that is in the microcrystalline silicon is removed, a surface area of the remaining microcrystalline silicon is increased.

Furthermore, in the case where lithium titanate is used, there is little volume change that comes with insertion and elimination of lithium ions, and there is an advantage that there is practically no capacitance deterioration.

A thickness of the second negative electrode layer 102 may be less than a thickness of the first negative electrode layer 101, and it is acceptable as long as there is sufficient thickness for interface reaction with the solid electrolyte, that is, sufficient thickness for ions functioning as carriers to move. The ions functioning as carriers move more easily in the second negative electrode layer 102 when the thickness of the second negative electrode layer 102 is made to be as thin as possible, and this also makes it easier for the ions functioning as carriers to move to the first negative electrode layer 101 with a large capacitance per unit volume. Accordingly, a negative electrode that has an outermost surface with improved adhesion because of the second negative electrode layer 102 and a large capacitance because of the first negative electrode layer 101 can be obtained. For example, the second negative electrode layer 102 may be formed with a thickness of 10 nm or more and 1 µm or less. The second negative electrode layer 102 like this one is formed by a dry thin film formation method such as a sputtering method or a CVD method, or by a wet thin film formation method such as a coating method.

By providing the second negative electrode layer 102 that is made of a material with favorable adhesion to the solid electrolyte so as to have a small thickness over the first negative electrode layer 101, a material with a large capacitance per unit volume can be used for the first negative electrode layer 101 and the thickness of the first negative electrode layer 101 can be made large. Accordingly, a negative electrode-active material layer with favorable adhesion to the solid electrolyte and a large capacitance per unit volume, and a negative electrode including the negative electrode-active material layer can be obtained.

The negative electrode-active material layer of this embodiment is a lamination including a negative electrode layer that is a lower layer made of the material with a large capacitance per unit volume and a negative electrode layer that is an uppermost layer made of the material with favorable adhesion to the solid electrolyte, which is formed over the lower layer negative electrode layer. By having this structure, resistance is reduced at an interface between the electrolyte and the negative electrode-active material layer, and in addition, it becomes possible to, for example, use for the lower layer negative electrode layer a material that has a larger capacitance per unit volume than the uppermost layer negative electrode layer, regardless of adhesion to the electrolyte. With this, a negative electrode-active material layer with an excellent charge/discharge characteristic that is also high capacitance, a negative electrode that includes the negative electrode-active material layer, and a power storage device that includes the negative electrode can be provided.

Here, a manufacturing method of the negative electrode-active material layer 104 including the first negative electrode layer 101 and the second negative electrode layer 102, and a negative electrode 105 in which the negative electrode-active material layer 104 is provided over the current collector 100 will be described.

First, the current collector 100 is prepared (see FIG. 1A). For the current collector 100, titanium (Ti), aluminum (Al), nickel (Ni), stainless steel, or the like can be used.

Figure 1B:
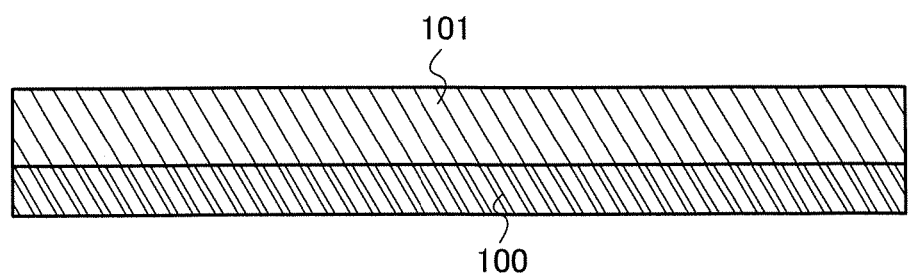

Next, the first negative electrode layer 101 is formed over the current collector 100 (see FIG. 1B). To form the first negative electrode layer 101, a sputtering method, a CVD method, or a coating method may be used, for example.

In the case that a coating method is used as a formation method of the first negative electrode layer 101, a carbon material or a composite material containing carbon that is the material for the first electrode layer 101 is made into a paste by combining it with a conduction auxiliary agent, a binder, or the like, and then applied over the current collector 100 and dried to form the first negative electrode layer 101. The first negative electrode layer 101 may be molded as needed by applying pressure.

Note that strictly speaking, "active material" refers only to a material that relates to insertion and elimination of ions functioning as carriers. In this specification, in the case that the first negative electrode layer 101 and the second negative electrode layer 102 to be described below are formed using a coating method, for the sake of convenience, the negative electrode-active material layer 104 will collectively refer to the material of the negative electrode-active material layer 104 including the first negative electrode layer 101 and the second negative electrode layer 102, that is, the material that is actually a "negative electrode-active material," and the conduction auxiliary agent, the binder, or the like.

Note that as the conduction auxiliary agent, an electron-conductive material which does not cause chemical change in the power storage device may be used. For example, a carbon-based material such as graphite or carbon fibers; a metal material such as copper, nickel, aluminum, or silver; or a powder or fiber of a mixture thereof can be used.

Note that as the binder, a polysaccharide such as starch, polyvinyl alcohol, carboxymethyl cellulose, hydroxypropyl cellulose, regenerated cellulose, or diacetyl cellulose; a thermoplastic resin such as polyvinyl chloride, polyvinyl pyrrolidone, polytetrafluoroethylene, polyvinylide fluoride, polyethylene, or polypropylene; or a polymer with rubber elasticity such as ethylene-propylene-diene monomer (EPDM), sulfonated EPDM, styrene-butadiene rubber, butadiene rubber, fluorine rubber, or polyethylene oxide can be given.

Figure 1C:
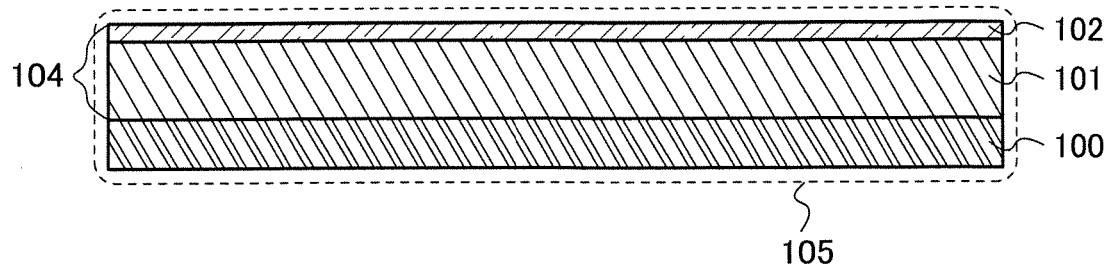

Next, the second negative electrode layer 102 is formed over the first negative electrode layer 101 (see FIG. 1C). In forming the second negative electrode layer 102, a sputtering method, a CVD method, or a coating method may also be used for example.

In the case that the first negative electrode layer 101 and the second negative electrode layer 102 are formed by a sputtering method, they can be formed by using a corresponding sputtering target for each of the layers. At this time, the first negative electrode layer 101 and the second negative electrode layer 102 may be formed consecutively or non-consecutively; however, by forming consecutively, adhesion is favorable at an interface between the first negative electrode layer 101 and the second negative electrode layer 102, and there is less possibility of an impurity entering the interface between the first negative electrode layer 101 and the second negative electrode layer 102.

Also, in the case of forming the second negative electrode layer 102 by a coating method, the material of the second negative electrode layer 102 is made into a paste by combining it with a conduction auxiliary agent, a binder, or the like, and then applied over the first negative electrode layer 101 and dried. Furthermore, the second negative electrode layer 102 may be molded as necessary by applying pressure.

Note that although a mode of providing a lamination of two layers of negative electrode layers is described in this embodiment, the embodiment is not limited thereto, and there may be 3 layers or more. In this case, another negative electrode layer may be formed between the first negative electrode layer 101 and the second negative electrode layer 102.

Accordingly, the negative electrode 105 can be manufactured which includes the negative electrode-active material layer 104 including the first negative electrode layer 101 and the second negative electrode layer 102, provided over the current collector 100.

The negative electrode-active material layer of this embodiment has a laminated structure of a plurality of negative electrode layers, and for the negative electrode layer of the uppermost layer, a material that has favorable adhesion to an electrolyte is used. By having this structure, it becomes possible to, for example, use for the negative electrode layer of a lower layer a material that has a larger capacitance per unit volume than the negative electrode layer of the uppermost layer, regardless of adhesion to an electrolyte; consequently, a power storage device with an excellent charge/discharge characteristic that is also high capacitance can be provided.

[Embodiment 2]

In this embodiment, as one example of a power storage device which is one mode of the present invention, a secondary battery and a manufacturing method thereof will be described with reference to FIG. 2, and FIGS. 3A and 3B.

A structure of a secondary battery of this embodiment is described with reference to FIG. 2. FIG. 2 is a pattern diagram showing an example of a structure of this embodiment.

Figure 2:
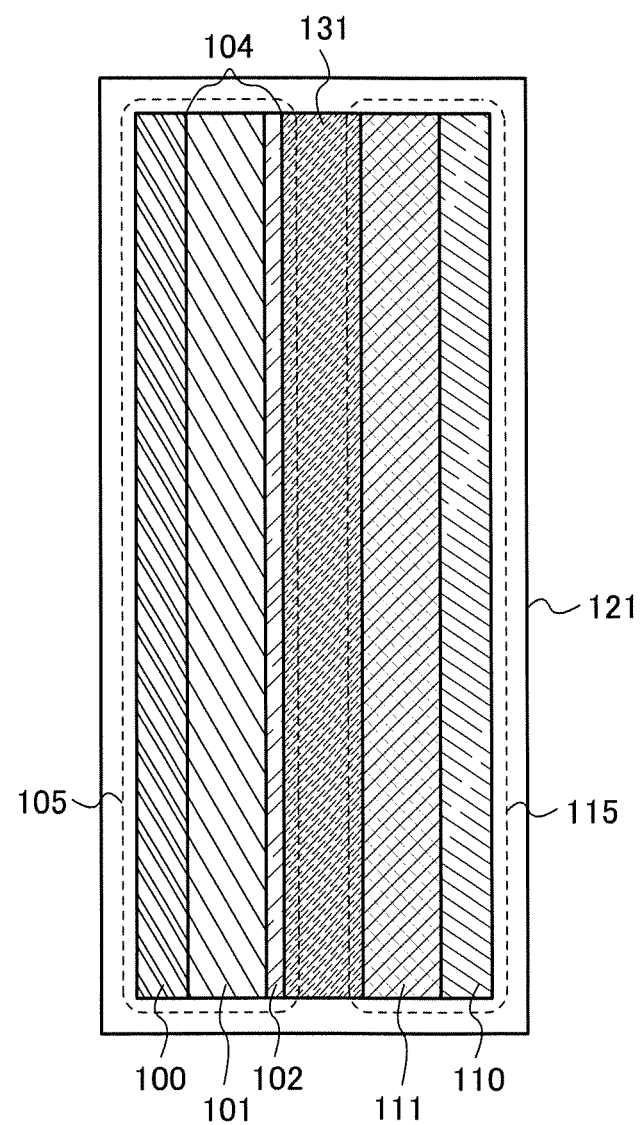
FIG. 2 shows a structure of a secondary battery.

The secondary battery shown in FIG. 2 includes the negative electrode 105 described in Embodiment 1, a positive electrode 115, and a solid electrolyte 131 interposed between the positive electrode 115 and the negative electrode 105.

As mentioned in Embodiment 1, the negative electrode 105 includes the current collector 100, and the negative electrode-active material layer 104 including the first negative electrode layer 101 and the second negative electrode layer 102 over the current collector 100. A material with which an interface with favorable adhesion to the solid electrolyte 131 can easily be formed is used as the material for forming the second negative electrode layer 102, and a material with a large capacitance per unit volume is used as the material for forming the first negative electrode layer 101; therefore, adhesion between the solid electrolyte 131 and the negative electrode 105 is improved further, and a secondary battery with a large capacitance can be obtained.

The positive electrode 115 includes a current collector 110 and a positive electrode-active material layer 111.

The current collector 110 can be formed using a conductive material such as aluminum, copper, nickel, or titanium, for example. Also, the current collector 110 can be formed using an alloy material containing a plurality of the above-mentioned conductive materials, such as an Al—Ni alloy, or an Al—Cu alloy, for example. Alternatively, a conductive layer that has been separately formed over a substrate may be peeled off and used as the current collector 110.

The positive electrode-active material layer 111 can be formed using a material containing ions functioning as carriers and a transition metal, for example. As the material containing ions functioning as carriers and a transition metal, a material represented by a general formula $A_hM_iPO_j$ ($h>0$, $i>0$, $j>0$) can be used, for example. Here, A represents, for example, an alkaline metal such as lithium, sodium, or potassium; or an alkaline earth metal such as beryllium, magnesium, calcium, strontium, or barium. M represents a transition metal such as iron, nickel, manganese, or cobalt, for example. As the material represented by the general formula $A_hM_iPO_j$ ($h>0$, $i>0$, $j>0$), lithium iron phosphate, sodium iron phosphate, or the like can be given. The material represented by A and the material represented by M may each be selected from one or more of the above materials.

Alternatively, a material represented by a general formula $A_hM_iO_j$ ($h>0$, $i>0$, $j>0$) can be used. Here, A represents, for example, an alkaline metal such as lithium, sodium, or potassium; or an alkaline earth metal such as beryllium, magnesium, calcium, strontium, or barium. M represents a transition metal such as iron, nickel, manganese, or cobalt, for example. As the material represented by the general formula $A_hM_iO_j$ ($h>0$, $i>0$, $j>0$), lithium cobaltate, lithium manganate, lithium nickelate, or the like can be given. The material represented by A and the material represented by M may each be selected from one or more of the above materials.

The positive electrode-active material layer 111 may be formed by making the material of the positive electrode-active material layer 111 into a paste by combining it with a conduction auxiliary agent, a binder, or the like and then applying it over the current collector 110, or by a sputtering method. In the case of forming the positive electrode-active material layer 111 by a coating method, the positive electrode-active material layer 111 may be molded as necessary by applying pressure.

Note that strictly speaking, "active material" refers only to a material that relates to insertion and elimination of ions functioning as carriers. In this specification, in the case that the positive electrode-active material layer 111 is formed using a coating method, for the sake of convenience, the positive electrode-active material layer 111 will collectively refer to the material of the positive electrode-active material layer 111, that is, the material that is actually a "positive electrode-active material," and the conduction auxiliary agent, the binder, or the like.

Here, a manufacturing method of the positive electrode-active material layer 111, and the positive electrode 115 that includes the positive electrode-active material layer 111 formed over the current collector 110, will be explained.

Figure 3A:
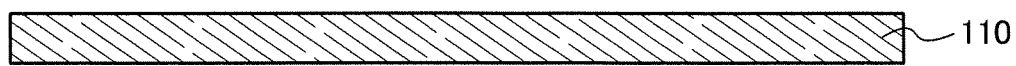
FIGS. 3A and 3B show a positive electrode-active material layer and a positive electrode including the positive electrode-active material layer, and a method of forming the positive electrode.

First, the current collector 110 is prepared (see FIG. 3A). Detailed description of the material and formation method of the current collector 110 will be omitted since it is already mentioned above.

Figure 3B:
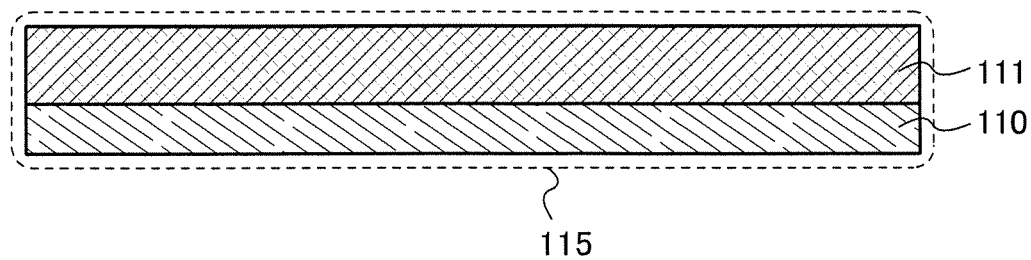

Next, the positive electrode-active material layer 111 is formed over the current collector 110 (see FIG. 3B). A material of the positive electrode-active material layer 111 is mentioned above. A formation method of the positive electrode-active material layer 111 may be a sputtering method or a coating method as mentioned above. Accordingly, the positive electrode 115 in which the positive electrode-active material layer 111 is formed over the current collector 110 is formed.

In the case of forming the positive electrode-active material layer 111 by a coating method, the material of the positive electrode-active material layer 111 may be made into a paste by combining it with a conduction auxiliary agent, a binder, or the like and then applied over the current collector 110 and dried. In the case for forming the positive electrode-active material layer 111 by a coating method, the positive electrode-active material layer 111 may be molded as necessary by applying pressure. For the binder, the binder mentioned in Embodiment 1 may be used.

Note that, in the case of forming the positive electrode-active material layer 111 by a coating method, by using for the binder a material that functions as a solid electrolyte, for example, a material with lithium ion conductivity such as polyethylene oxide, a characteristic at an interface between the solid electrolyte and the positive electrode can be improved. Accordingly, a secondary battery with an even more favorable characteristic can be obtained.

After forming the positive electrode 115 and the negative electrode 105, the solid electrolyte 131 is formed between the positive electrode 115 and the negative electrode 105.

As an example of the solid electrolyte 131, a polymer electrolyte or a gel electrolyte can be given. As an example of a polymer electrolyte, a composite material of a polymer and a lithium salt typified by polyethylene oxide (PEO) or polypropylene oxide (PPO) can be given.

As an example of a lithium salt, lithium chloride (LiCl), lithium fluoride (LiF), lithium perchlorate (LiClO$_4$), lithium tetrafluoroborate (LiBF$_4$), LiAsF$_6$, LiPF$_6$, Li(C$_2$F$_5$SO$_2$)$_2$N, or the like can be given.

Alternatively, another alkali metal salt may be used instead of lithium salt. As another alkali metal salt, a sodium salt can be given for example. As an example of such sodium salt, sodium chloride (NaCl), sodium fluoride (NaF), sodium perchlorate (NaClO$_4$), sodium tetrafluoroborate (NaBF$_4$), or the like can be given.

As an example of a gel electrolyte (polymer-gel electrolyte), a material in which a nonaqueous electrolytic solution is added to a host polymer of PVDF-HFP which is a copolymer of polyvinylidene fluoride (also called polyvinylidene difluoride abbreviated as PVDF) and hexafluoropropylene (HFP), polyethylene oxide (PEO), porous PVDF, or the like, can be given.

The nonaqueous electrolytic solution contains cations functioning as carrier ions such as alkaline metal ions, specifically, lithium ions or sodium ions, and these lithium ions or sodium ions are responsible for electrical conduction. The nonaqueous electrolytic solution contains, for example, a solvent and an alkaline metal salt that is dissolved therein, such as a lithium salt or a sodium salt. As the lithium salt and sodium salt, the materials mentioned above may be used.

As the solvent, one type or a combination of two or more type of the following materials is used, for example: cyclic carbonates such as ethylene carbonate (hereinafter abbreviated as EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), methylpropyl carbonate (MPC), methylisobutyl carbonate (MIBC), and dipropyl carbonate (DPC); aliphatic carboxylic acid esters such as methyl formate, methyl acetate, methyl propionate, and ethyl propionate; γ-lactones such as γ-butyrolactone; acyclic ethers such as 1,2-dimethoxyethane (DME), 1,2-diethoxyethane (DEE), and ethoxymethoxy ethane (EME); cyclic ethers such as tetrahydrofuran and 2-methyltetrahydrofuran; dimethylsulfoxide; 1,3-dioxolane and the like; alkyl phosphate esters such as trimethyl phosphate, triethyl phosphate, and trioctyl phosphate and fluorides thereof.

The solid electrolyte 131 contains an electrolyte that is a fluid, and as a whole it is in a quasi-solid state. Leakage does not easily occur because the solid electrolyte 131 is in a quasi-solid state as a whole.

The negative electrode 105, the positive electrode 115, and the solid electrolyte 131 provided between the positive electrode 115 and the negative electrode 105 can be covered by a protective material 121, and a secondary battery manufactured in this manner can be manufactured into various types, such as a button-type, a laminate-type, or a cylinder-type.

As described above, in this embodiment, a secondary battery can be manufactured using the negative electrode 105 described in Embodiment 1.

The negative electrode-active material layer of this embodiment has a laminated structure of a plurality of negative electrode layers, and for the negative electrode layer of the uppermost layer, a material that has favorable adhesion to an electrolyte is used. By having this structure, it becomes possible to, for example, use for the negative electrode layer of a lower layer a material that has a larger capacitance per unit volume than the negative electrode layer of the uppermost layer, regardless of adhesion to an electrolyte; consequently, a power storage device with an excellent charge/discharge characteristic that is also high capacitance can be provided.

[Embodiment 3]

As one example of a power storage device which is one mode of the present invention that is disclosed, a capacitor and a manufacturing method thereof will be described with reference to FIG. 4, and FIGS. 5A to 5D.

Figure 4:
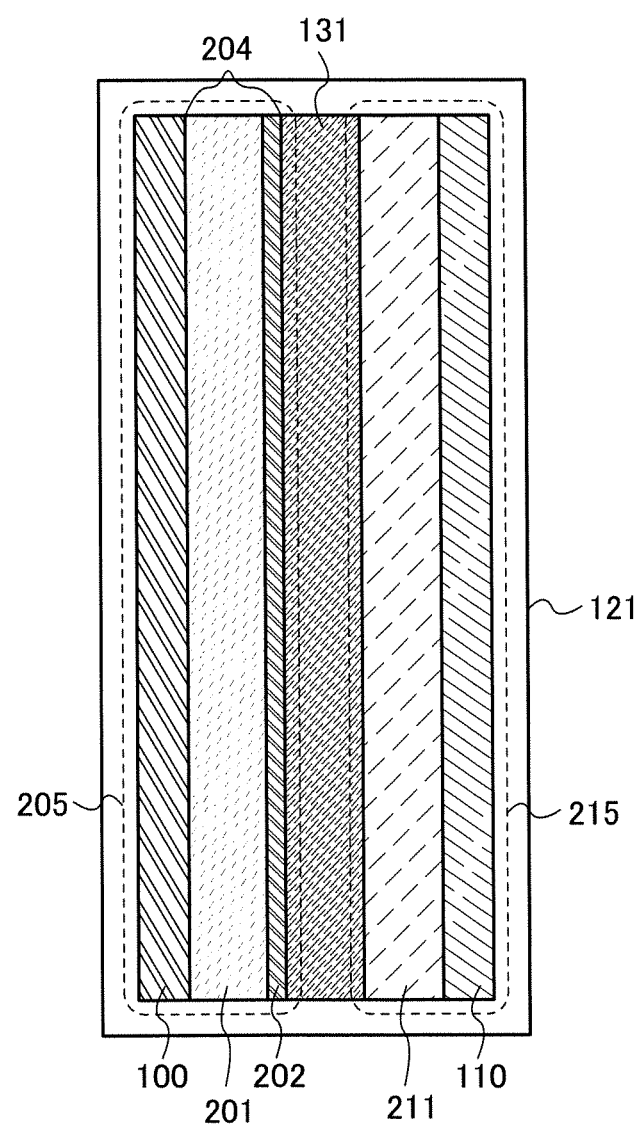
FIG. 4 shows a structure of a capacitor.

A structure of the capacitor of this embodiment is described with reference to FIG. 4. FIG. 4 is a pattern diagram showing one example of a structure of the capacitor of this embodiment.

The capacitor shown in FIG. 4 includes a negative electrode-active material layer 204 in which a first negative electrode layer 201 and a second negative electrode layer 202 are laminated. Also, the capacitor includes a negative electrode 205 in which the negative electrode-active material layer 204 is provided over the current collector 100. Furthermore, the capacitor includes the negative electrode 205, a positive electrode 215 that includes the current collector 110 and a positive electrode-active material layer 211, and the solid electrolyte 131 that is between the positive electrode 215 and the negative electrode 205.

For the first negative electrode layer 201 of this embodiment, the first negative electrode layer 101 described in Embodiment 1 can be used. In the same manner as the first negative electrode layer 101 described in Embodiment 1, the first negative electrode layer 201 of this embodiment has an advantage of having a large capacitance per unit volume.

In the case where the second negative electrode layer 202 of this embodiment is formed of a material selected from among the materials of the second negative electrode layer 102 described in Embodiment 1, namely the nitride of lithium and a transition metal represented by Li$_a$M$_b$N$_z$ (M is a transition metal, 0.1≤a≤2.8 (a is 0.1 or more and 2.8 or less), $0.2 \leq b \leq 1.0$ (b is 0.2 or more and 1.0 or less), $0.6 \leq z \leq 1.4$ (z is 0.6 or more and 1.4 or less)) which contains lithium (Li) and nitrogen (N), or a material containing ions functioning as carriers such as lithium titanate ($Li_4Ti_5O_{12}$), the second negative electrode layer 202 can be formed using the same material and the same formation method as the second negative electrode layer 102 of Embodiment 1.

Since the above-mentioned material has favorable adhesion to a solid electrolyte, resistance is small at an interface between a solid electrolyte and a negative electrode provided with the above-mentioned material over its outermost surface. With this, a characteristic of the power storage device such as the charge/discharge characteristic is improved.

The second negative electrode layer 202, which is formed of the above-mentioned material with favorable adhesion to the solid electrolyte, is formed over a surface of the first negative electrode layer 201, which is formed of the material with a large capacitance per unit volume. When the negative electrode, in which a thin film with favorable adhesion to the solid electrolyte is provided over a negative electrode layer with a large capacitance per unit volume, is used, a power storage device with a favorable characteristic such as a charge/discharge characteristic, which also has a large capacitance, can be obtained.

Among nitrides of lithium and a transition metal, $Li_{3-x}M_xN$ having a lithium nitride ($Li_3N$) type structure shows the largest charge/discharge capacitance with x at around 0.4. Consequently, the most preferable value of b is 0.4. If the value of b is out of the above-mentioned range, the structure becomes unstable and there is a possibility of the charge/discharge capacitance ceasing to be released.

Regarding the value of a, it is preferable that a=3−b in order for $Li_aM_bN_z$ to have a lithium nitride ($Li_3N$) type structure. Regarding the lower limit of a, when the case in which Li is eliminated is considered, a value smaller than 2 can be chosen, which is the value of a when b is at its maximum value of 1. However, in the same manner as b, if the value of a is out of the above-mentioned range, the structure becomes unstable and there is a possibility of the charge/discharge capacitance ceasing to be released.

Furthermore, the value of z is most preferably 1, in order for $Li_aM_bN_z$ to have a lithium nitride ($Li_3N$) type structure. If the value of z is out of the above-mentioned range, there is a possibility of $Li_aM_bN_z$ ceasing to have a lithium nitride ($Li_3N$) type structure.

Note that, M is one or more types of metal. In the case that M includes one type of metal, any one of cobalt, nickel, and copper may be selected. In the case that M includes a plurality of types of metal, at least one or a plurality of cobalt, nickel and copper are included, and a Group 3 element, a Group 4 element, or a Group 5 element may additionally be included.

Since it is preferable that M be a metal with which an oxidation-reduction reaction occurs as well as a metal which valence changes, a transition metal is used. Among transition metals, any one of cobalt, nickel, and copper may be selected in the case that M is one type of transition metal, and a reason for this is explained below.

Among nitrides of lithium and a transition metal, a large capacitance can be obtained particularly with $Li_{3-x}Co_xN$, $Li_{3-x}Ni_xN$, and $Li_{3-x}Cu_xN$ each having a lithium nitride ($Li_3N$) type structure, because the insertion-elimination reaction of lithium ions progresses with a low voltage of 1 V (vs $Li^+/Li$) or lower.

Alternatively, instead of lithium (Li) in $Li_aM_bN_z$, an alkaline metal such as sodium (Na) or potassium (K), or an alkaline earth metal such as beryllium (Be), magnesium (Mg), calcium (Ca), strontium (Sr), or barium (Ba) may be used.

Since the above-mentioned alkaline metal element other than lithium or the alkaline earth metal element is low in cost compared to lithium, by using the above-mentioned element instead of lithium, manufacturing cost of the power storage device can be reduced.

In the case of using the other alkaline metal element or the alkaline earth metal element mentioned above instead of lithium in $Li_aM_bN_z$, since adhesion is favorable between such a material and a solid electrolyte, resistance is small at an interface between the solid electrolyte and a negative electrode provided with the above material on its outermost surface. With this, a characteristic of the power storage device such as the charge/discharge characteristic is improved.

When the negative electrode, in which a thin film with favorable adhesion to the solid electrolyte is provided over a negative electrode layer with a large capacitance per unit volume, is used, a power storage device with a favorable characteristic such as a charge/discharge characteristic, which also has a large capacitance, can be obtained.

However, in the case where the second negative electrode layer 202 is not formed of a material containing ions functioning as carriers, such as a silicon material, ions functioning as carriers may be injected to an active material layer in advance. A technique of injecting ions functioning as carriers to the active material in advance (also called "pre-doping") is described below.

Furthermore, by also injecting ions functioning as carriers to the first negative electrode layer 201 in advance in both cases of the second negative electrode layer 202 being formed and not formed of a material containing ions functioning as carriers, more ions functioning as carriers can be utilized.

First, the current collector 100 is prepared according to Embodiment 1 mentioned above, and then the first negative electrode layer 201 is formed over the current collector 100 using the same material and the same formation method as the first negative electrode layer 101 mentioned above (see FIG. 5A).

Figure 5A:
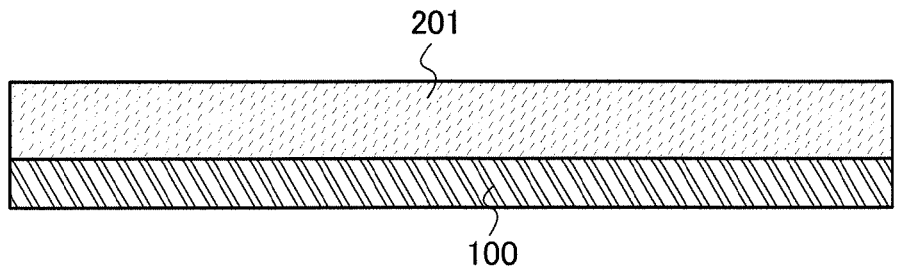
FIGS. 5A to 5D shows a negative electrode-active material layer and a negative electrode including the negative electrode-active material layer, and a method of forming the negative electrode.
Figure 5B:
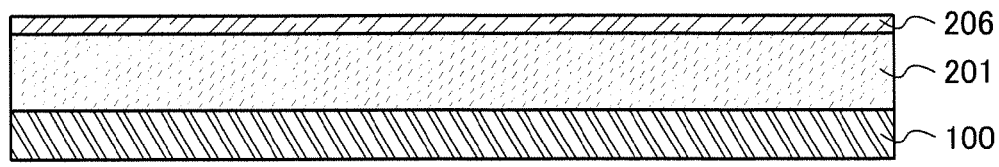

Next, a second negative electrode layer 206 is formed over the first negative electrode layer 201 (see FIG. 5B). This second negative electrode layer 206 is made of a material that does not contain ions functioning as carriers, among materials of the second negative electrode layer 102 of Embodiment 1 as mentioned above.

Figure 5C:
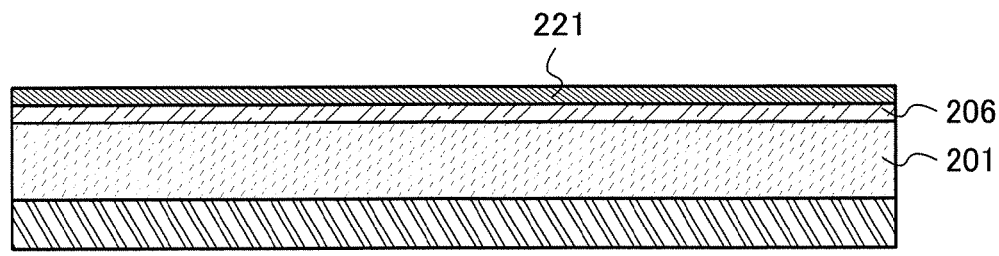

Next, a metal layer 221 containing ions functioning as carriers is formed over the second negative electrode layer 206 (see FIG. 5C).

For the metal layer 221, a material containing an alkaline metal, an alkaline earth metal, or the like can be used, for example. Although an example of separately preparing a metal sheet made of an alkaline metal or an alkaline earth metal for the metal layer 221 is described here, formation of the metal layer 221 is not limited thereto, and a metal film can be formed using a chemical vapor deposition method, a physical vapor deposition method, or the like. As an example of a chemical vapor deposition method, a CVD method can be used, and as an example of a physical vapor deposition method, a sputtering method or a vacuum evaporation method can be used. Note that although the metal layer 221 is shown to have even thickness in FIG. 5C, it is not limited thereto and the metal layer 221 may have regions with different thicknesses or may have a plurality of divided regions.

Figure 5D:
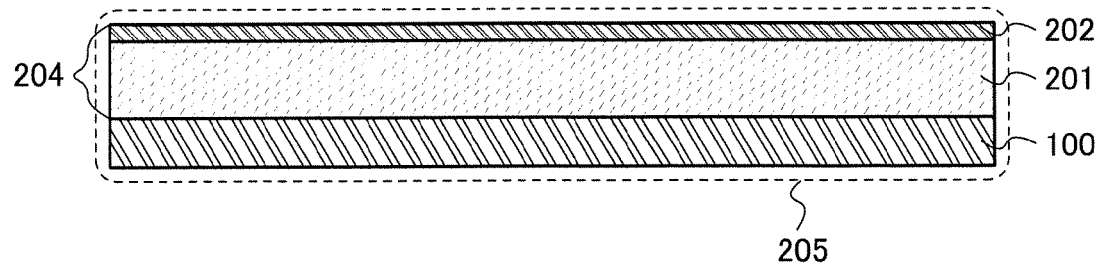

After that, the first negative electrode layer 201 and the second negative electrode layer 206 are impregnated while the metal layer 221 is ionized. Ionization of the metal layer 221 proceeds with time, and the negative electrode-active material layer 204 is formed as shown in FIG. 5D. Note that although an example in which the entire metal layer 221 is ionized and impregnated to the negative electrode-active material layer 204 is described in FIG. 5D, pre-doping is not limited thereto, and a portion of the metal layer 221 may remain over a surface of the negative electrode-active material layer 204.

Even if the second negative electrode layer 202 is formed of a material that does not contain ions functioning as carriers, the second negative electrode layer 202 and the solid electrolyte 131 have favorable adhesion to each other and therefore does not easily peel off from each other, and a capacitor with a favorable characteristic can be obtained.

Furthermore, by injecting ions functioning carriers to the negative electrode in advance, potential can be reduced for the negative electrode, and by utilizing a potential difference between the negative electrode and the positive electrode, a high withstand voltage can be obtained.

In the above manner, the current collector 100, and the negative electrode-active material layer 204 which is a lamination of the first negative electrode layer 201 and the second negative electrode layer 202 formed over the current collector 100, are formed, and the negative electrode 205 including the current collector 100 and the negative electrode-active material layer 204 can be obtained.

The current collector 110 of the positive electrode 215 is the same as the current collector 110 described in Embodiment 2.

The positive electrode-active material layer 211 included in the positive electrode 215 can be formed using activated carbon, carbon nanotube, fullerene, polyacene, or the like. Also, the positive electrode-active material layer 211 may be formed by a sputtering method or a coating method.

In the case of forming the positive electrode-active material layer 211 by a coating method, the material of the positive electrode-active material layer 211 may be made into a paste by combining it with a conduction auxiliary agent, a binder, or the like and then applied over the current collector 110. In the case of forming the positive electrode-active material layer 211 by a coating method also, the positive electrode-active material layer 211 may be molded as necessary by applying pressure.

Note that as described above, strictly speaking, "active material" refers only to a material that relates to insertion and elimination of ions functioning as carriers. In this specification, in the case that the positive electrode-active material layer 211 is formed using a coating method, for the sake of convenience, the positive electrode-active material layer 211 will collectively refer to the material of the positive electrode-active material layer 211, that is, the material that is actually a "positive electrode-active material," and the conduction auxiliary agent, the binder, or the like.

Note that, in the case of forming the positive electrode-active material layer 211 by a coating method, by using for the binder a material that functions as a solid electrolyte, for example, a material with lithium ion conductivity such as polyethylene oxide, a characteristic at an interface between the solid electrolyte and the positive electrode can be improved. Accordingly, a capacitor with an even more favorable characteristic can be obtained.

A specific example of forming the positive electrode-active material layer 211 by a coating method will be described below. For example, activated carbon functioning as a positive electrode-active material is provided over the current collector 110. First, activated carbon functioning as a positive electrode-active material, acetylene black (AB) functioning as a conduction auxiliary agent, and polyvinylidene fluoride (PVDF) are combined with a ratio of 79:5:16, and the mixture is soaked in N-methylpyrrolidone (NMP) and stirred to form a paste. Then, the paste is applied over the current collector and dried to form the positive electrode-active material layer 211. The positive electrode-active material layer 211 may also be molded as necessary by applying pressure.

After obtaining the positive electrode 215 and the negative electrode 205, the solid electrolyte 131 is placed between the positive electrode 215 and the negative electrode 205. The solid electrolyte 131 of this embodiment is the same as the solid electrolyte 131 described in Embodiment 2.

In the same manner as in Embodiment 2, the positive electrode 215, the negative electrode 205, and the solid electrolyte 131 provided between the positive electrode 215 and the negative electrode 205 can be covered by a protective material 121, and a capacitor manufactured in this manner can be manufactured into various types, such as a button-type, a laminate-type, or a cylinder-type.

As described above, in this embodiment, a capacitor can be manufactured using the negative electrode described in Embodiment 1, and a negative electrode that is the negative electrode described in Embodiment 1 doped with ions functioning as carriers in advance.

The negative electrode-active material layer of this embodiment has a laminated structure of a plurality of negative electrode layers, and for the negative electrode layer of the uppermost layer, a material that has favorable adhesion to an electrolyte is used. By having this structure, it becomes possible to, for example, use for the negative electrode layer of a lower layer a material that has a larger capacitance per unit volume than the negative electrode layer of the uppermost layer, regardless of adhesion to an electrolyte; consequently, a capacitor with an excellent charge/discharge characteristic that is also high capacitance can be provided.

This application is based on Japanese Patent Application serial no. 2010-007001 filed with Japan Patent Office on Jan. 15, 2010, the entire contents of which are hereby incorporated by reference.

What is claimed is:
1. An electricity storage device comprising:
   a current collector in a plate-like form; and
   a negative electrode-active material layer formed on the current collector, the negative electrode-active material layer having a laminate structure comprising:
      a first negative electrode layer over the current collector, the first negative electrode layer comprising a carbon material or a composite material containing carbon; and
      a second negative electrode layer over the first negative electrode layer, the second negative electrode layer containing a nitride of lithium and a transition metal represented by $Li_aM_bN_z$, where M represents the transition metal, a is 0.1 or more and 2.8 or less, b is 0.2 or more and 1.0 or less, and z is 0.6 or more and 1.4 or less,
   wherein the current collector, the first negative electrode layer and the second negative electrode layer are discretely laminated on one another, and wherein the first negative electrode layer is interposed between the current collector and the second negative electrode layer.

2. An electricity storage device according to claim 1, wherein the second negative electrode layer has a smaller capacitance than the first negative electrode layer.

3. An electricity storage device according to claim 1, wherein the second negative electrode layer is made of a material having a smaller volume change than graphite during an insertion-elimination reaction of ions.

4. An electricity storage device comprising:
a current collector in a plate-like form; and
a negative electrode-active material layer formed on and in contact with the current collector, the negative electrode-active material layer having a laminate structure comprising:
  a first negative electrode layer comprising graphite; and
  a second negative electrode layer over the first negative electrode layer, the second negative electrode layer comprising a nitride of lithium and a transition metal represented by $Li_aM_bN_z$, where M represents the transition metal, a is 0.1 or more and 2.8 or less, b is 0.2 or more and 1.0 or less, and z is 0.6 or more and 1.4 or less,
wherein the current collector, the first negative electrode layer and the second negative electrode layer are discretely laminated on one another, and
wherein the first negative electrode layer is interposed between the current collector and the second negative electrode layer.

5. An electricity storage device according to claim 4, wherein the second negative electrode layer has a smaller capacitance than the first negative electrode layer.

6. An electricity storage device according to claim 4, further comprising:
a positive electrode; and
a solid electrolyte interposed between the positive electrode and the negative electrode-active material layer,
wherein the solid electrolyte is a gel electrolyte or a polymer electrolyte.

7. An electricity storage device according to claim 4, further comprising:
a positive electrode; and
a solid electrolyte interposed between the positive electrode and the negative electrode-active material layer,
wherein the solid electrolyte is in direct contact with the negative electrode-active material layer.

8. An electricity storage device according to claim 4, wherein the second negative electrode layer is made of a material having a smaller volume change than graphite during an insertion-elimination reaction of ions.

9. An electricity storage device comprising:
a current collector in a plate-like form; and
a negative electrode-active material layer formed on and in contact with the current collector, the negative electrode-active material layer having a laminate structure comprising:
  a first negative electrode layer comprising a carbon material or a composite material containing carbon; and
  a second negative electrode layer over the first negative electrode layer, the second negative electrode layer comprising a nitride of lithium and a transition metal represented by $Li_aM_bN_z$, where M represents the transition metal, a is 0.1 or more and 2.8 or less, b is 0.2 or more and 1.0 or less, and z is 0.6 or more and 1.4 or less,
wherein the current collector, the first negative electrode layer and the second negative electrode layer are discretely laminated on one another,
wherein the first negative electrode layer is interposed between the current collector and the second negative electrode layer, and
wherein a thickness of the second negative electrode layer is less than a thickness of the first negative electrode layer.

10. An electricity storage device according to claim 1, further comprising:
a positive electrode; and
a solid electrolyte interposed between the positive electrode and the negative electrode-active material layer,
wherein the solid electrolyte is a gel electrolyte or a polymer electrolyte.

11. An electricity storage device according to claim 1, further comprising:
a positive electrode; and
a solid electrolyte interposed between the positive electrode and the negative electrode-active material layer,
wherein the solid electrolyte is in direct contact with the negative electrode-active material layer.

12. An electricity storage device according to claim 1, further comprising a positive electrode and a dry polymer electrolyte,
wherein the negative electrode-active material layer is between the current collector and the dry polymer electrolyte,
wherein the second negative electrode layer is in direct contact with the dry polymer electrolyte, and
wherein the dry polymer electrolyte is interposed between the negative electrode-active material layer and the positive electrode.

13. An electricity storage device according to claim 4, further comprising a positive electrode and a dry polymer electrolyte,
wherein the negative electrode-active material layer is between the current collector and the dry polymer electrolyte,
wherein the second negative electrode layer is in direct contact with the dry polymer electrolyte, and
wherein the dry polymer electrolyte is interposed between the negative electrode-active material layer and the positive electrode.

14. An electricity storage device according to claim 9, further comprising a positive electrode and a dry polymer electrolyte,
wherein the negative electrode-active material layer is between the current collector and the dry polymer electrolyte,
wherein the second negative electrode layer is in direct contact with the dry polymer electrolyte, and
wherein the dry polymer electrolyte is interposed between the negative electrode-active material layer and the positive electrode.

15. An electricity storage device according to claim 1, wherein the second negative electrode layer comprises a layer of the nitride of lithium and a transition metal represented by $Li_aM_bN_z$ and a layer of a silicon material.

16. An electricity storage device according to claim 1, wherein the second negative electrode layer comprises a layer of the nitride of lithium and a transition metal represented by $Li_aM_bN_z$ and a layer of a lithium titanate.

17. An electricity storage device according to claim 1, wherein the second negative electrode layer comprises a layer of the nitride of lithium and a transition metal represented by $Li_aM_bN_z$, a layer of a silicon material, and a layer of a lithium titanate.

18. The electricity storage device according to claim 1,
wherein an active material of the first negative electrode layer is only the carbon material or the composite material containing carbon, and
wherein an active material of the second negative electrode layer is only the nitride of lithium and the transition metal represented by $Li_aM_bN_z$.

19. The electricity storage device according to claim 1, wherein the first negative electrode layer has been formed on the current collector as a first plate in a first step and the second negative electrode layer has been formed on the first negative electrode layer as a second plate in a second step distinct from the first step.

20. The electricity storage device according to claim 1, wherein the first negative electrode layer has been formed by applying pressure so as to form a first plate in a first step and the second negative electrode layer has been formed by applying pressure so as to form a second plate in a second step distinct from the first step.

* * * * *